Figure 1:
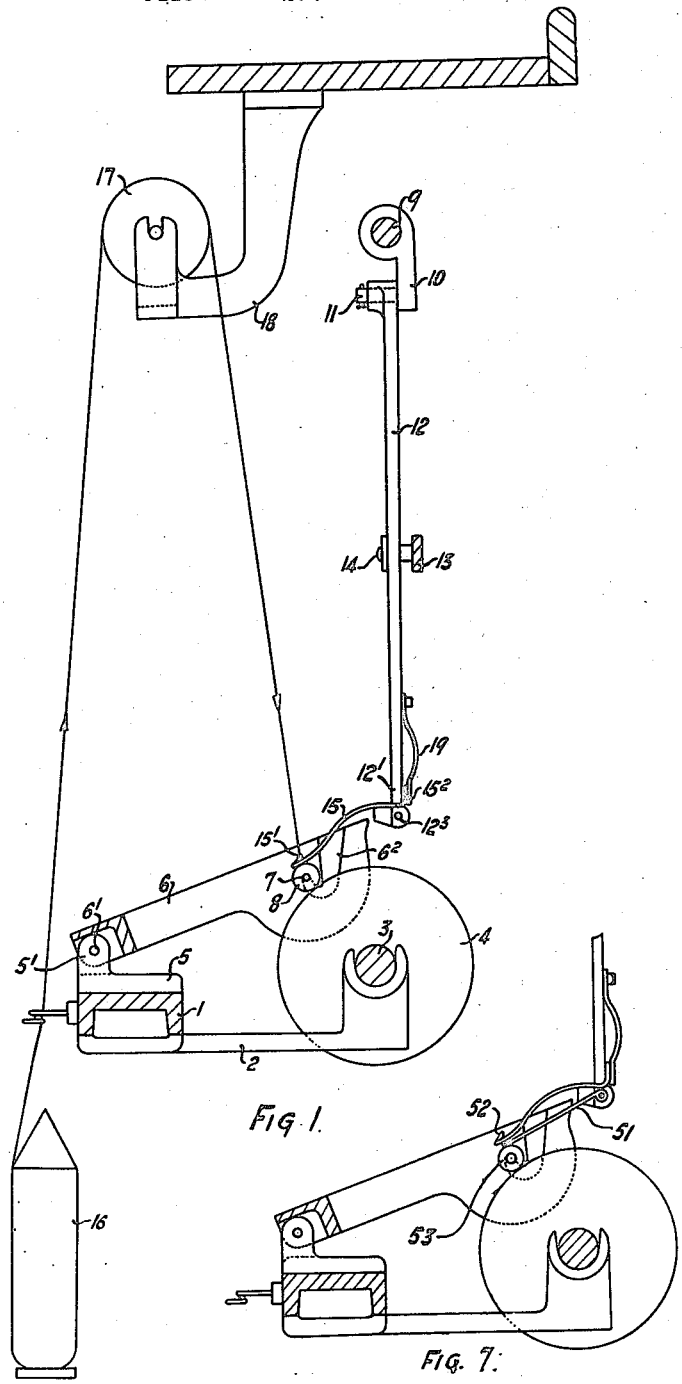

Patented Nov. 6, 1923.

1,473,172

UNITED STATES PATENT OFFICE.

THOMAS A. BOYD AND HAROLD A. BOYD, OF SHETTLESTON, GLASGOW, SCOTLAND.

CHEESE-WINDING MACHINE.

Application filed February 27, 1922. Serial No. 539,563.

*To all whom it may concern:*

Be it known that we, THOMAS ALEXANDER BOYD and HAROLD ARTHUR BOYD, both subjects of the King of the United Kingdom of Great Britain and Ireland, and residing at Shettleston, Glasgow, Scotland, have invented a certain new and useful Improvement in Cheese-Winding Machines, of which the following is a specification.

This invention refers to machines for winding yarns on to cheeses and has for its objects improved means of forming such cheeses, and improved traverse mechanism therefor affording greater convenience in operation. (By the term "cheese" we mean yarn wound in parallel layers on a parallel or tapered base.)

The invention comprises mechanism which, during the formation of a cheese, diminishes the length of the traverse so as to make one or both ends of the cheese beveled, with the object of overcoming the trouble which arises when the thread is thrown by the traverse beyond the end of the cheese. This result is obtained by employment of a traverse element of fixed range serving one or more cheeses, and the provision for each cheese of independent mechanism so contrived that the action of the yarn on the cheese as it increases in diameter shall reduce the length of the traverse given to yarn being wound thereon.

The said mechanism may include a traverse lever pivoted at one end and having an unvarying traverse. At the other end of the lever is a thread guide resting on the cheese and so arranged that the distance from the point of delivery of the thread to the pivot of the lever is reduced automatically by the increase in diameter of the cheese, thereby imparting a gradually shorter traverse to the thread and producing the beveled end or ends on the cheese. This arrangement is applicable to a machine for forming a single cheese or to a machine for producing simultaneously a group of cheeses. In the latter case each cheese is independent as regards the shortening of the traverse.

Alternatively, there may be provided a thread guide which rests upon or is held close to the yarn on the surface of the cheese and which is moved away from the axis of the cheese by the action of the yarn as the cheese increases in diameter, there being interposed between the thread guide and the yarn on the cheese a guide wire which extends from end to end of the cheese and serves as a rest upon which the thread guide is traversed to and fro across the cheese, and also as a guide for the yarn, which, after coming through the thread guide, passes around the wire on to the cheese. As the cheese forms, the thread guide and wire are gradually and automatically moved outwards from the centre of the cheese. The guide wire renders the thread guide self-threading.

The invention further includes means for withdrawing the guide wire and the thread guide from the cheese for the purpose of piecing the yarn or removing a cheese when wound.

Where the cheeses are formed upon revolving spindles, means may be provided to slacken the band which drives the spindle and to apply a brake to the spindle.

Figure 2:
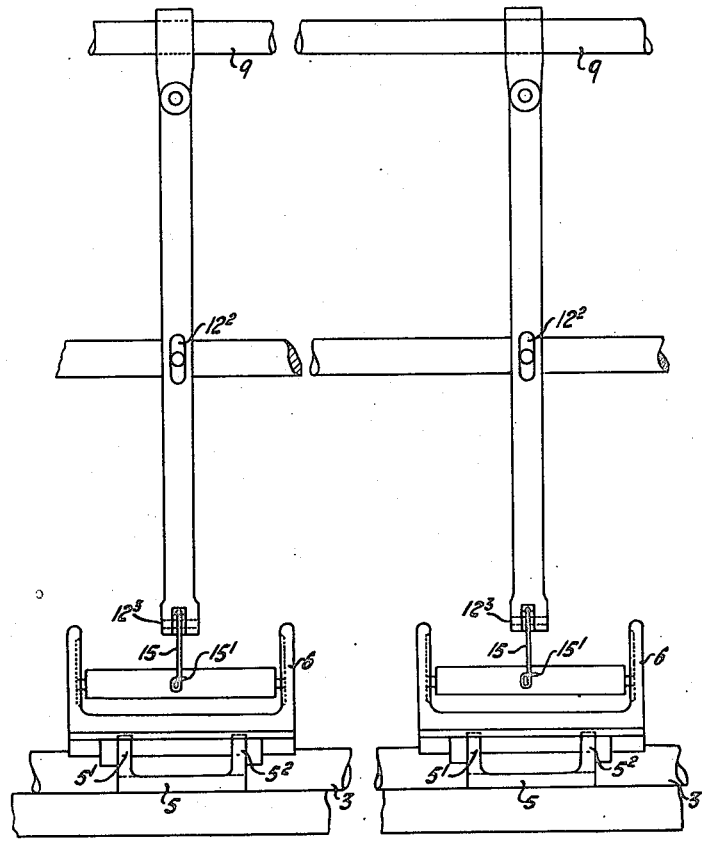
Figure 3:
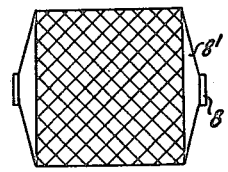
Figure 4:
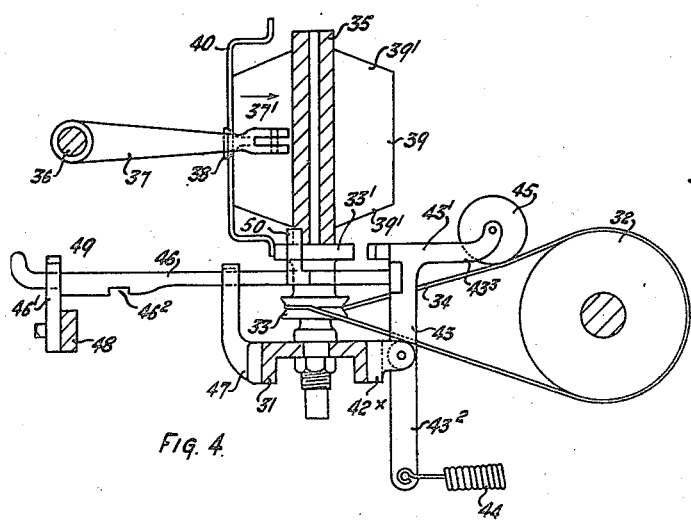
Figure 5:
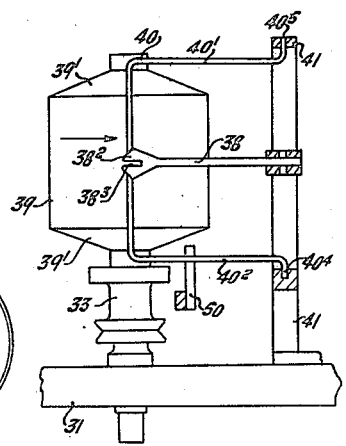
Figure 6:
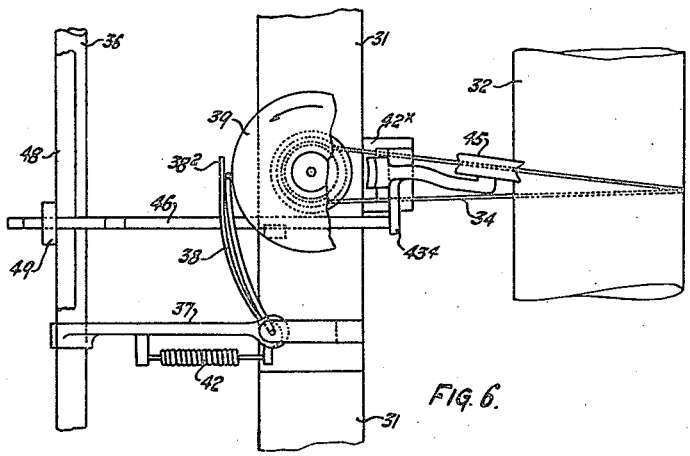

In the accompanying drawings which illustrate the invention Figs. 1 to 3 represent essential parts of a cheese winding machine in which each cheese is driven frictionally at its periphery. Figs. 4, 5 and 6 represent a cheese winding machine in which each cheese is wound upon a revolving spindle. Fig. 7 is a detail view showing a modification of the form illustrated in Fig. 1.

In a practical example of the invention embodied in a drum winding machine adapted to wind a single thread on to a wooden cylindrical tube to form a cheese with both ends beveled, we employ, as shown in Figs. 1, 2 and 3, a main rail 1 extending from end to end of the frame. On the main rail 1 we fix shaft bearings 2 in which we support a shaft 3 fitted with a drum 4 for each cheese. The shaft 3 is disposed parallel with the main rail 1 and at a suitable distance therefrom.

On the main rail 1 we fix a bracket 5 with two upstanding snugs $5^1$ between which is pivoted a double-jawed cheese-holder 6. The pivot $6^1$ is parallel with the shaft 3. Near the free end $6^2$ of the cheese holder 6 are bearings $6^2$ carrying a spindle 8 which runs loosely in the cheese holder 6. On the spindle 7 we fit a wooden tube 8. The cheese holder 6 is adapted to press the tube 8 towards the face of the drum 4 which drives it and is raised by the cheese as the latter increases in diameter. In the same vertical plane as the shaft 3 at a suitable height we fix horizontally on the framing a pivot shaft 9 which extends from end to end of the machine. On the pivot shaft 9 above the axis of the drum 4 we mount a pivot bracket 10 having a stud 11 projecting forward at right angles to the vertical plane containing the axis of the shaft 3. On this stud 11 we pivot a traverse lever 12 which extends downward almost to the drum. Between the stud 11 and the lower end $12^1$ of the lever 12 we mount on the framing a horizontal traverse bar 13 extending from end to end of the frame. The traverse bar 13 is at a convenient distance behind the vertical plane containing the axis of the drum shaft 3. On the bar 13 we fix a traverse stud 14 disposed horizontally at right angles to the bar. The stud 14 passes through a slot $12^2$ in the traverse lever 12 and from the stud 14 the lever 12 receives an unvarying traverse. At the lower end $12^1$ of the lever 12 we joint on a pivot $12^3$ parallel to the shaft 3 a thread guide 15 which extends forward and rests upon the tube 8 when the latter is empty. At the outer end of the thread guide 15 where it rests on the tube 8 we form a curl $15^1$ through which the yarn passes on its way to the cheese. The yarn is drawn from a cop placed in front of the machine, and is taken over a guide pulley 17 carried on a bracket 18 on the framing and down through the curl $15^1$ to the cheese. When winding is proceeding, the thread guide 15 traverses the yarn from end to end of the tube 8. As the cheese increases in diameter, the curl $15^1$ of the thread guide 15 is raised, thereby shortening its effective distance from the pivot stud 11 on which the lever 12 works, thus reducing the amount of traverse given to the yarn and thereby forming beveled ends on the cheese. The thread guide 15 is so fitted that the curl $15^1$ presses on the yarn of the cheese during winding but may be drawn upwards clear of the cheese by hand or by the raising of the cheese for the purpose of removing a full cheese for piecing or otherwise. We extend the thread guide 15 to the rear of the lever 12 and thence upwards to receive pressure from a flat spring 19 fixed to the back of the lever 12. As the curl $15^1$ is raised due to the increasing diameter of the cheese, the spring 19 acting on the rearward extension of the guide 15 keeps the curl $15^1$ pressed on the yarn. The operator may by raising the cheese holder 6 and the cheese lift the curl $15^1$ so far that the rear extension of the thread guide 15 passes beyond its pivot centre and is thrown upwards by the spring whereby the curl $15^1$ is held raised.

In a second practical example of our invention as embodied an upright spindle winding machine for winding single yarn on to parallel cheeses having beveled ends we employ, as shown in Figs. 4, 5 and 6, a horizontal main rail 31 supported on the framing of the machine and extending from end to end of the same. Behind the rail 31 we mount and drive in bearings on the framing a tin roller 32 parallel with and a suitable distance above the rail 31. On the rail 31 we mount at a suitable distance apart a group of self-contained upright spindles upon which the cheeses are wound. Each spindle 33 is driven by a band 34 from the roller 32 and on it is a wooden tube 35 on which the yarn is wound. At a suitable distance in front of and above and parallel with the rail 31 we mount upon a framing a traverse shaft 36 having an unvarying reciprocating movement. The shaft 36 is operated by ordinary traverse mechanism at any desired speed in relation to the speed of the spindles which it serves. In front of the spindle 33 to one side of the same we mount upon the shaft 36 a traverse lever 37 which extends towards the spindle 33 and to the inner end $37^1$ of which is pivoted a thread guide 38 which extends horizontally in front of the spindle 33 and is traversed up and down to distribute the yarn upon the cheese 39 as it is being wound. Between the thread guide 38 and the tube 35 we mount vertically a guide wire 40 which rests upon the yarn during the winding operation. The guide wire 40 is bent horizontally at its upper and lower ends $40^1$ and $40^2$ and then vertically upwards at its upper extremity and downwards at its lower extremity. The extremities $40^3$ and $40^4$ are pivoted clear of the traverse lever 37 and the pivot $38^1$ of the thread guide 38 in a bracket 41 supported on the main rail. The pivots $40^3$ and $40^4$ of the guide wire are coaxial with the pivot $38^1$ of the thread guide 38 when the latter is in mid position. By means of a helical spring the thread guide 38 is caused to press the guide wire 40 against the yarn on the cheese 39 which pushes the guide wire 40 and thread guide 38 outwards towards the traverse shaft 36 which is the pivot of the lever 37 as the cheese forms. The distance from the point of delivery $38^2$ of the thread guide 38 to the traverse shaft or pivot of the traverse lever 37 being gradually shortened, the traverse given to the yarn is gradually reduced as the cheese increases in diameter, so that beveled ends $39^1$ are formed upon the cheese. At the free end 32 of the thread guide where it extends beyond the guide wire is a horizontal slit $38^3$ which receives and guides the yarn, which, after passing through the slit $38^3$, passes around and below the guide wire 40 on to the cheese 39. The guide wire 40 is slightly cambered vertically so as to maintain a uniform distance frrom the guide wire 40 to the end $38^2$ of the thread guide 38 which moves in a lateral as well as in a vertical arc. The end $38^2$ of the thread guide 38 which extends beyond the guide wire 40 is beveled on its top and bottom edge so that the thread resting on the guide wire 40 at the start of the winding operation will pass into the slit 38³. Thus, the guide wire 40 provides a surface on which the thread guide 38 slides and also renders the thread guide 38 self-threading. For the purpose of slackening the driving band 34, braking the spindle 33 and withdrawing the thread guide 38 and guide wire 40 from the cheese 39 when the yarn is to be pieced or the cheese removed, we mount on the back of the rail 31 behind the spindle 33 a bracket 42ˣ to which is pivoted a brake lever 43 including an arm 43¹ extending upwards behind the spindle wharve 33¹ and having a leather face. The brake lever 43 also includes a downwardly extending arm 43² to which is connected one end of a helical spring 44 which normally urges the brake against the spindle 33. From the upper part 43¹ of the brake lever 43 a lateral arm 43³ extends inwards towards the roller 32, said arm 43³ carrying at its end a band tightening pulley 45. When the spindle 33 is working, the brake is held away from the wharve 33¹ by the slide rod 46 hereafter described and the band pulley 45 is caused to tighten the band 34. When the spindle 33 is to be stopped, the brake is allowed to press on the wharve 33¹ and the band pulley 45 partially or wholly lifted off the band. On the front of the rail 31 between the wire guide bracket 41 and the spindle 33, we mount an inner slide bracket 47, and in front of the rail 31 we mount at a suitable distance therefrom an outer rail 48 on which we mount an outer slide bracket 49. In these slide brackets 49, 47 we place a slide bar 46 which projects across the rail 31 at right angles thereto and contacts with a projection 43⁴ on the brake lever 43. A catch 46¹ on the under side of the front end of the slide bar 46 engages with the outer bracket 49 when the brake 43 is pushed clear of the spindle wharve 33¹ and the pulley 45 is tightening the band 34. On the slide rod 46 we fix behind the guide wire 40 an upstanding stud 50 adapted to engage with and withdraw the guide wire from the cheese. When the spindle 33 is to be stopped to piece an end or remove a cheese, the slide bar 46 is lifted to disengage the catch 46¹ and then drawn forward and dropped to effect engagement of the inner catch 46². By this operation the brake is applied to the wharve 33¹, the band 34 is slackened, the spindle 33 stopped, and the thread guide 38 and wire guide 44 withdrawn from, and held out of contact with the cheese 39. The yarn having been pieced, or, in the case of a new cheese, having been attached to the spindle, the slide rod is shifted to engage the outer catch 46¹, whereupon the spindle starts winding and the thread automatically enters the thread guide.

The modification shown in Fig. 7 corresponds with the form shown in Fig. 1, but includes a guide wire 51 interposed between the thread guide 52 and the tube 53.

We claim:—

1. In a cheese winding machine, in combination, a traverse lever mounted to rock on a stationary pivotal axis at one end and a thread guide operated by said lever and so arranged as to be movable away from the axis of the cheese as the diameter of the cheese increases to bring the point of thread delivery nearer to said stationary axis to reduce the length of traverse of yarn on the cheese, and thus to form bevelled ends upon the cheese.

2. In a cheese winding machine, a traverse lever pivoted at one end to rock on a stationary axis and having an unvarying traverse, and a thread guide, jointed to the other end of said lever, for delivering the thread to the cheese, said guide being adapted by the action of the cheese as it forms to reduce automatically the distance from the point of thread delivery to the said stationary axis and thus gradually to reduce the length of traverse given to the yarn as the cheese is being wound.

3. In a cheese winding machine, in combination, a traverse lever pivoted at one end to rock on a stationary axis and having an unvarying traverse, a thread guide at the other end of said lever adapted by the action of the cheese as it forms to reduce automatically the distance from the point of thread delivery of the thread to the said stationary axis and thereby gradually to reduce the length of the traverse given to the yarn as the cheese is being wound, and a guide wire resting on the cheese and located between the cheese and the thread guide.

4. In a cheese winding machine, in combination, a pivot shaft mounted to rock upon a stationary axis, a traverse lever mounted at one end on said shaft, and having an unvarying oscillating movement, and a thread guide jointed to the other end of said lever, and movable away from the axis of the cheese as it forms in the direction to bring the point of delivery of the thread nearer to said shaft and thereby to reduce the length of traverse of the yarn on the cheese.

In testimony whereof we have signed our names to this specification in the presence of two subscribing witnesses.

T. A. BOYD.
H. A. BOYD.

Witnesses:
 Isabel Rollo,
 Kate Fotheringham.